(12) United States Patent
Hattori

(10) Patent No.: US 7,978,244 B2
(45) Date of Patent: Jul. 12, 2011

(54) IMAGE SENSOR AND AN ELECTRONIC INFORMATION DEVICE

(75) Inventor: Shinji Hattori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 728 days.

(21) Appl. No.: 12/152,501

(22) Filed: May 14, 2008

(65) Prior Publication Data

US 2008/0284891 A1    Nov. 20, 2008

(30) Foreign Application Priority Data

May 16, 2007    (JP) ................................. 2007-131071

(51) Int. Cl.
H04N 5/335    (2006.01)
(52) U.S. Cl. ......................... 348/308; 348/296; 348/302
(58) Field of Classification Search .......... 348/294–297, 348/302, 308
See application file for complete search history.

(56) References Cited

U.S. PATENT DOCUMENTS 6,933,974 B2    8/2005    Lee

FOREIGN PATENT DOCUMENTS

| CN | 1330411 A | 1/2002 |
|---|---|---|
| JP | 2002-044524 | 2/2002 |
| JP | 2004-112740 | 4/2004 |
| JP | 2005-341509 | 12/2005 |

OTHER PUBLICATIONS

Office Action issued in corresponding Chinese Application No. 200810099070.1 on Sep. 25, 2009.

*Primary Examiner* — Darryl J Collins
(74) *Attorney, Agent, or Firm* — Edwards Angell Palmer & Dodge LLP; David G. Conlin; Stephen D. LeBarron

(57) ABSTRACT

An image sensor is disclosed. The image sensor includes a plurality of pixels arranged in a matrix which detects a pixel signal of each pixel based on a voltage difference between a reset voltage which is a reference voltage of each pixel and a signal voltage generated by a photoelectric conversion at each pixel, and includes a plurality of read lines located for each pixel column, wherein the reset voltage and the signal voltage are read from the pixel of the corresponding pixel column; and a reset current supply section provided for each read line, wherein at the same time a first reset current is supplied from a pixel to the read line when reading the reset voltage from the pixel, the section supplies a second reset current to the read line such that a sum of the first reset current and the second reset current is constant.

15 Claims, 12 Drawing Sheets

(a)

(b)

(c)

(Lm2<Lm5)

(a) During normal luminance  (b) During high luminance

Prevent voltage decrease

IMAGE SENSOR AND AN ELECTRONIC INFORMATION DEVICE

This Nonprovisional Application claims priority under 35 U.S.C. §119(a) on Patent Application No. 2007-131071 filed in Japan on May 16, 2007, the entire contents of which are hereby incorporated by reference.

BACKGROUND OF THE INVENTION

1. Field of the Invention

The present invention relates to an image sensor and an electronic information device, particularly to an improvement in quality of locally bright images such as sunlight and the like. The present invention can be applied to a pixel read circuit such as of a CMOS image sensor used in an electronic image capturing device such as a video camera, a digital camera and the like.

2. Description of the Related Art

FIG. 8 is a diagram describing a conventional image sensor. This diagram shows one pixel in an image sensor and a circuit holding a signal value read from the pixel. FIG. 9 is a timing chart describing the operation of a conventional image sensor.

A pixel 200 constituting the conventional image sensor 20, as shown in FIG. 8, for example, comprises a photo diode PD which is a photoelectric conversion element for converting light into electrons, a reset transistor M1 for resetting the cathode potential thereof to a reset voltage, a read transistor M2 for amplifying and reading the photoelectric conversion signal generated at the photo diode PD and reading as a pixel voltage, and a selecting transistor M3 for selecting the pixel.

In the image sensor, a plurality of such pixels 200 is arranged in a matrix, and a read line 202 is located for each pixel column. All pixels of one pixel column are connected to a read line 202, and each read line 202 is connected to one constant-current source 203.

Moreover, a sample and hold circuit 210 is connected to each read line 202, and the sample and hold circuit 210 holds a pixel voltage read to the read line 202 which corresponds to the cathode potential of the photo diode.

A reset noise is superimposed to the cathode potential when resetting. This reset noise is different for every pixel since it depends on the dispersion in transistor characteristic and dispersion in parasitic capacitance in the pixel. Herein, in order to remove this reset noise, a correlated double sampling circuit is used for the sample and hold circuit 210. This correlated double sampling circuit holds a reset voltage which is a reference voltage of each pixel and a pixel voltage generated by a photoelectric conversion in each pixel, respectively, and detects a pixel signal of each pixel based on a voltage difference of these voltages.

Next, the operation is described.

First, when the pixel selection signal (SEL) is at an H level, the selecting transistor M3 is turned on and a predetermined pixel 200 is selected.

Then, a first reset operation is performed in a reset time period T1. That is, by the reset (RST) signal being at an H level and the reset transistor M1 being turned on, the gate of the read transistor M2 is charged by a reset voltage, the read transistor M2 is turned on, and the read line 202 becomes a reset potential. To be exact, although the reset potential (i.e., gate potential of a read transistor while the reset transistor is turned on) is a potential lower than the source potential VD by the amount of threshold voltage of the reset transistor M1, in the operational description of the pixel, the reset potential is also referred to as the VD voltage at portions where there is no particular distinction needed between them.

In the integral time period T2 thereafter, RST signal is at an L level, and the reset transistor is turned off. Thus, the potential of the gate 201 of the read transistor M2 gradually decreases due to the charge generated at the photo diode PD, and the pixel voltage read to the read line 202 also gradually decreases.

The correlated double sampling circuit 210 samples and holds the pixel voltage Vs read to the read line 202 as a signal voltage just before the end of the integral time period T2.

After the second reset operation is performed in time period T3, the correlated double sampling circuit 210 samples and holds the pixel voltage VD' read to the read line 202 as a reset voltage, within the reset level read time period T4 which is shorter than the integral time period T2.

The sample and hold circuit outputs the voltage difference between the signal voltage Vs which was sampled and held at the integral time period T2 after the first reset operation and the reset voltage VD' which was sampled and held within the short time period T4 after the second reset operation, as the pixel signal which is a photo-detection signal detected at the pixel.

In this way, by outputting the difference between the two sample and hold voltages, a reset noise is removed from the pixel signal read from the pixel.

However, when an area with a luminance which is extremely high compared with the surrounding images such as sunlight and the like locally exists in the captured image, with the pixel which corresponds thereto, the photoelectric conversion current generated by the photo diode becomes extremely large. Therefore, as shown in FIG. 9(b), in the reset noise read time period T4 after the second reset operation, the cathode potential thereof rapidly decreases.

As a result, the voltage difference between the two sample and hold voltages becomes very small. That is, originally, at the area with a high luminance such as sunlight and the like, the pixel signal level to be detected is expected to be at a maximum level. However, since the reset noise read in the reset noise read time period becomes too large, the pixel signal level cannot be obtained as expected. Thus, the obtained output image is an image with an extremely low sunlight luminance. In an extreme case, as shown in FIG. 12(a), the sun becomes a black image Im1.

In the conventional image sensor, a method for improving the quality of the image with a local high luminance is studied. For example, Reference 1 discloses an example.

FIG. 10 is a diagram describing an image sensor disclosed in this reference. In FIG. 10, similar reference numerals refer to similar parts of FIG. 8.

The image sensor 20a comprises a control circuit 204 inserted between the read line 202 and the correlated double sampling circuit 210 in the conventional image sensor 20 shown in FIG. 8. The image sensor 20a controls such that the potential supplied from the read line 202 to the correlated double sample and hold circuit 210 does not become lower than the predetermined threshold value Vth, in the reset noise read time period T4.

The control circuit 204 includes a two-input OR circuit 207 for inputting an enabling (EN) signal and a signal from the read line 202, an inverter INV for inverting the output of the OR circuit 207, a transmission transistor M40 connected between the read line 202 and the correlated double sampling circuit 210 wherein the output of the OR circuit 207 is input to the gate, and a pull-up transistor M50 for fixing the input of the correlated double sampling circuit 210 at the VD voltage wherein the gate is connected to the output of the inverter INV.

In this image sensor 20a, during signal reading (time period T2), the EN signal input to the OR circuit 207 in the control circuit 204 is fixed at an H level. At this time, since the output 205 of the OR circuit 207 is always at an H level, the transmission transistor M40 connected between the read line 202 and the output signal 206 of the control circuit 204 is in an ON state.

At this time, since the input signal 205 of the inverter INV in the control circuit 204 is at an H level, the output signal of this inverter INV is at a L level. Thus, the gate of the pull-up transistor M50 for the output signal 206 of the control circuit 204 is at a L level, and the pull-up transistor M50 is in an OFF state.

Therefore, the voltage level of the read line 202 is transmitted to the correlated double sampling circuit 210 through the control circuit 204.

Next, during reset level reading (time period T4), in the image sensor 20a, the EN signal input to the OR circuit 207 in the control circuit 204 is fixed at a L level. When the image includes an image with a local high luminance such as the sun and the bulb, the voltage of the read line 202 which is another input signal of the OR circuit may become lower than the threshold value of the OR circuit. At this time, since the output 205 of the OR circuit is at a L level, the transmission transistor M40 connected between the read line 202 and the output signal 206 of the control circuit 204 is in an OFF state.

At this time, since the input signal 205 of the inverter INV in the control circuit 204 is at a L level, the output signal of the inverter INV is at an H level. The gate of the pull-up transistor M50 for the output signal 206 of the control circuit 204 is at an H level, and the pull-up transistor M50 is in an ON state. Therefore, the output signal 206 of the control circuit 204 is held at the VD voltage.

FIG. 11 is a timing diagram describing a specific circuit operation when the image sensor shown in FIG. 10 is receiving a strong light (during high luminance). FIG. 11 shows a pixel signal read operation during high luminance and a reset signal read operation during high luminance. Herein, a state in which the pixel 200 is selected is shown, and the SEL signal selecting the pixel 200 is at an H level.

The pixel signal read operation during high luminance is described.

At the first reset time period T1, the RST signal is at an H level. With the reset transistor M1 shown in FIG. 10 being turned on, the gate 201 of the read transistor M2 is at the VD voltage. Since the SEL signal is at an H level, the selecting transistor M3 is in an ON state. Therefore, the level of the read line 202 is at the VD voltage.

At this time, since the EN signal shown in FIG. 11 is at an H level, the OR circuit output 205 in the control circuit 204 is at an H level, and the transmission transistor M40 is in an ON state. Thus, the VD voltage of the read line 202 is transmitted to the output 206 of the control circuit 204. Therefore, as shown in FIG. 11, the output 206 of the control circuit 204 is at the VD voltage.

Next, in the integral time period T2, since the RST signal is at a L level, the reset transistor M1 is turned off, and as a result, due to the current generated by the photo diode and the reset noise, the voltage at the gate 201 of the read transistor M2 is decreased. During high luminance, the gate 201 of the read transistor M2 is at or lower than the threshold voltage of the read transistor M2, and the read transistor M2 is turned off.

At this time, since there is no more current supplied from the pixel 200 to the constant-current source 203, the read line 202 is at a minimum voltage, and the output 206 of the control circuit 204 is also at a minimum voltage. This minimum potential is held at the correlated double sample and hold circuit 210 as a signal potential in the integral time period T2.

The reset operation during high luminance is described.

At the second reset time period T3, the RST signal is again at an H level. Similar to the first reset time period T1, the gate 201 of the read transistor M2 is at the VD voltage.

Next, when the RST signal is at L a level, the reset read time period T4 starts. In this time period, due to the influence of the reset noise and the luminance signal, i.e., the current generated by the photo diode shown in FIG. 10, the voltage at the gate 201 of the read transistor M2 in the pixel 200 shown in FIG. 10 decreases. During high luminance, similar to the integral time period T2, the gate 201 of the read transistor M2 is at or lower than the threshold value of the read transistor M2, and the read transistor M2 is turned off. Therefore, the read line 202 is lowered to the minimum voltage.

Then, during the time for detecting the reset signal, the EN signal input to the control circuit 204 is at a L level. Therefore, when the voltage of the read line 202 is at or lower than the threshold voltage Vth of the OR circuit in the control circuit 204, since the other input signal EN is at L level, the OR circuit output 205 in the control circuit 204 is at L level. Since this OR circuit output 205 is a gate signal of the transmission transistor M40, the transmission transistor M40 is turned off. The output of the inverter INV which has the OR circuit output 205 as the input is at H level. By the pull-up transistor M50 being turned on, the output signal 206 of the control circuit 204 is at the VD voltage.

This VD voltage is held by the correlated double sampling circuit 210 which is the step after the control circuit 204, before the EN signal is at H level, within the reset read time period T4.

In this way, the difference between the signal voltage which is the output signal 206 generated in time period T2 (minimum voltage) and the reset voltage which is the output signal 206 generated in time period T4 (VD voltage) is detected at the correlated double sampling circuit 210, and the pixel signal during high luminance is output.

Reference 1: Japanese Laid-Open Publication No. 2004-112740

SUMMARY OF THE INVENTION

As described above, there may be cases where the subject, which is to supposed to be white when the high luminance subject such as the sun and the bulb is captured by the image sensor, is black. However, this is a typical problem caused by an image sensor having a correlated double sampling circuit which outputs the difference between the reset voltage and the signal voltage as a photo-detection signal (pixel signal).

This is because a strong light is incident on the transistor constituting the pixel, and the reset voltage suddenly drops during the reading.

Due to such sudden drop of the reset voltage during reading, the difference between the signal voltage and the reset voltage becomes small, and as shown in FIG. 12(a), a phenomenon of the high luminance subject blackening occurs.

Although the techniques described in the aforementioned reference are for improving these problems, in the techniques of this reference, the control circuit 204 added to each read line has ten transistor elements. When adding the control circuit for each read line, it leads to an increase in chip size. That is, the control circuit comprises six transistors constituting the OR circuit 207, two transistor constituting the inverter INV, and transistors M40 and M50.

Although the control circuit 204 detects the problem of the reset voltage dropping due to the high luminance blackening phenomenon, the threshold value upon detecting the drop in the reset voltage may disperse depending on the manufacturing dispersion of characteristics and the like of the transistor constituting the OR circuit in the control circuit 204. For example, a problem occurs where a dispersion of unnatural colors appears, such as one part of the sun being a gray color and another part of the sun being a red color.

The present invention is intended to solve the conventional problems described above. The objective of the present invention is to obtain an image sensor and an electronic information device using such image sensor which is capable of avoiding a phenomenon of the blackening of the high luminance subject while suppressing the increase in the chip size and the dispersion of natural colors in the high luminance subject.

An image sensor according to the present invention comprises a plurality of pixels arranged in a matrix which detects a pixel signal of each pixel based on a voltage difference between a reset voltage which is a reference voltage of each pixel and a signal voltage generated by a photoelectric conversion at each pixel, the image sensor comprising: a plurality of read lines located for each pixel column, wherein the reset voltage and the signal voltage are read from the pixel of the corresponding pixel column; and a reset current supply section provided for each read line, wherein at the same time a first reset current is supplied from a pixel to the read line when reading the reset voltage from the pixel, the section supplies a second reset current to the read line such that a sum of the first reset current and the second reset current is constant, thereby attaining the aforementioned purpose.

Preferably, in an image sensor according to the present invention, the pixel comprises a first read transistor for supplying the first reset current to the read line by an application of the reset voltage to a gate in a time period for reading the reset voltage, and for supplying a pixel current corresponding to the signal voltage to the read line by an application of the signal voltage to a gate in a time period for reading the signal voltage; and the reset current supply section comprises a second read transistor for supplying the second reset current to the read line by an application of the reset voltage to a gate in a time period for reading the reset voltage.

Preferably, in an image sensor according to the present invention, a gate length of a second read transistor constituting the reset current supply section is longer than a gate length of a first read transistor constituting the pixel.

Preferably, in an image sensor according to the present invention, the reset current supply section comprises: a reset current supply circuit comprising a plurality of transistors in a serial connection which are connected between a source voltage and the read line, wherein at least one of the plurality of transistors in a serial connection is controlled to be in a conducting state for a time period for reading the reset voltage; and a constant-current source connected between the read line and a ground voltage.

Preferably, in an image sensor according to the present invention, the reset current supply circuit comprises two transistors in a serial connection connected between the source voltage and the read line; a source voltage is supplied to a gate of a transistor at the source voltage side of the two transistors in a serial connection; and a control signal is supplied to a gate of a transistor at the read line side of the two transistors in a serial connection.

Preferably, in an image sensor according to the present invention, the reset current supply circuit comprises two transistors in a serial connection connected between the source voltage and the read line; and a control signal is supplied to gates of the two transistors in a serial connection.

Preferably, in an image sensor according to the present invention, the reset current supply circuit comprises two transistors in a serial connection connected between the source voltage and the read line; a reset voltage is supplied to a gate of a transistor at the read line side of the two transistors in a serial connection; and a control signal is supplied to a gate of a transistor at the source voltage side of the two transistors in a serial connection.

Preferably, in an image sensor according to the present invention, the reset current supply circuit comprises a single transistor connected between the source voltage and the read line; a control signal is supplied to a gate of the single transistor.

Preferably, in an image sensor according to the present invention, the pixel comprises: a photo diode for performing a photoelectric conversion; a selecting transistor for selecting the pixel; a read transistor connected between the selecting transistor and the reset voltage, the read transistor for reading a level of a charge generated by the photoelectric conversion at the photo diode; a reset transistor for controlling the read transistor such that the read transistor outputs the reset voltage; and a transmission transistor for transmitting a charge level generated by the photoelectric conversion at the photo diode to the read transistor, wherein in the selected pixel, after the reset voltage is read, a signal voltage generated by the photoelectric conversion is read.

Preferably, in an image sensor according to the present invention, the reset current supply current is a dummy pixel located in a shaded area, wherein the dummy pixel comprises: a photo diode for performing a photoelectric conversion; a selecting transistor for selecting the dummy pixel in a period for reading the reset voltage; a read transistor connected between the selecting transistor and the source voltage, the read transistor for reading a level of a charge generated at the dummy pixel; a reset transistor for always supplying the reset voltage to the gate of the read transistor; and a transmission transistor connected between the photo diode and the read transistor, wherein a gate voltage is fixed at an off voltage of the transistor.

Preferably, in an image sensor according to the present invention, the reset current supply current is a dummy pixel located in a shaded area, wherein the dummy pixel comprises: a selecting transistor for selecting the dummy pixel in a period for reading the reset voltage; a read transistor connected between the selecting transistor and the source voltage, the read transistor for reading a level of a charge generated at the dummy pixel; and a reset transistor for always supplying the reset voltage to the gate of the read transistor.

Preferably, in an image sensor according to the present invention, the pixel comprises: a photo diode for performing a photoelectric conversion; a selecting transistor for selecting the pixel; a read transistor connected between the selecting transistor and the source voltage, the read transistor for reading a level of a charge generated by the photoelectric conversion at the photo diode; and a reset transistor for controlling the read transistor such that the read transistor outputs the reset voltage, wherein in the selected pixel, after a signal voltage generated by the photoelectric conversion is read, the reset voltage is read.

Preferably, in an image sensor according to the present invention, the reset current supply current is a dummy pixel located in a shaded area, wherein the dummy pixel comprises: a photo diode for performing a photoelectric conversion; a selecting transistor for selecting the dummy pixel in a period for reading the reset voltage; a read transistor connected between the selecting transistor and the source voltage, the read transistor for reading a level of a charge generated at the dummy pixel; and a reset transistor for always supplying the reset voltage to the gate of the read transistor.

Preferably, in an image sensor according to the present invention, the reset current supply current is a dummy pixel located in a shaded area, wherein the dummy pixel comprises: a selecting transistor for selecting the dummy pixel in a period for reading the reset voltage; a read transistor connected between the selecting transistor and the source voltage, the read transistor for reading a level of a charge generated at the dummy pixel; and a reset transistor for always supplying the reset voltage to the gate of the read transistor.

An electronic information device according to the present invention uses the image sensor in an image capturing section, thereby attaining the aforementioned purpose.

The functions of the present invention having the structures described above will be described hereinafter.

In the present invention, a reset current supply section is provided for each of the plurality of read lines in which a reset voltage and a signal voltage are read from the pixel of the corresponding pixel column, wherein at the same time a first reset current is supplied from a pixel to the read line when reading the reset voltage from the pixel, the section supplies a second reset current to the read line such that a sum of the first reset current and the second reset current is constant. Thus, even if the first reset current from the pixel suddenly decreases during the reading of the reset voltage, the second reset current is supplied to the read line from the reset current supply section such that the reset voltage level of the read line is almost constant. Thus, in the reset current supply section, it is not required to detect the level of the reset voltage in the read line. Therefore, even if the characteristics of the transistor constituting the reset current supply section disperse between a plurality of read lines, the dispersion of unnatural colors in a high luminance subject in a display image caused by the error in the threshold value for detecting the decrease in the reset voltage can be avoided. As a result, the dispersion of unnatural colors in a high luminance subject in a display image can be decreased.

Since it is not required to detect the level of the reset voltage in the read line, it is not necessary to use a circuit requiring many elements, such as a logic circuit, in a reset current supply section.

By connecting a constant-current source between the read line and the ground, and having the sum of the reset currents supplied from the pixel and the reset current supply section to the read line always being constant, the reset current supply means may be configured only by a single transistor connected between the source voltage and the read line which is controlled to be conducting only for the reading time period of the reset voltage. The occupied area of the circuit constituting the reset current supply section can be largely decreased, and the increase in the chip size can be suppressed.

In the present invention, the gate length of the second read transistor for supplying the second reset current to the read line which constitutes the reset current supply section is longer than the gate length of the first read transistor for supplying the first reset current to the read line which constitutes the pixel. Thus, during reading of the reset voltage, the first reset current read from the pixel is dominant over the second reset current read from the reset voltage supply section. Thus, even if there is a dispersion in the second reset current due to the manufacturing dispersion of the circuit constituting the reset current supply section, the negative effect to the reset voltage can be decreased. As a result, the dispersion of unnatural colors in the high luminance subject in the display image can be even more decreased.

In the present invention, since the reset current supply section is constituted by a dummy pixel located in a shaded area, a new circuit space constituting the reset current supply section is not needed. The consistency of the characteristic and the like between the circuit constituting the pixel and the circuit constituting the reset current supply section can be made higher, and a problem of the reset current supply capability of the reset current supply section being largely different from the reset current supply capability of the pixel can be avoided.

According to the present invention, a reset current supply section is, provided to suppress the high luminance blackening, wherein at the same time a first reset current is supplied from a pixel to the read line when reading the reset voltage from the pixel, the section supplies a second reset current to the read line such that a sum of the first reset current and the second reset current is constant. The circuit for the high luminance blackening suppression can be configured by small transistors used in a pixel, and a high luminance blackening suppression can be performed without having an increase in the chip size.

Since the reset current supply section supplies the reset current to the read line such that the reset voltage of the read line does not drop, a detecting circuit seen in the prior art is not required, and the dispersion of the unnatural colors of the high luminance subject in the display image caused by a detection threshold value error can be avoided.

By having the gate length of the read transistor for supplying the second reset current which constitutes the reset current supply section being longer than the gate length of the read transistor for supplying the first reset current which constitutes the pixel, the dispersion of color in the high luminance subject due to the manufacturing dispersion of the transistor threshold value in the reset current supply section can be even more alleviated.

These and other advantages of the present invention will become apparent to those skilled in the art upon reading and understanding the following detailed description with reference to the accompanying figures.

BRIEF DESCRIPTION OF THE DRAWINGS

FIG. 1 is a diagram describing an image sensor of the Embodiment 1 of the present invention, in which FIG. 1(a) shows exemplary configurations of a pixel and a reset current supply circuit in the image sensor, FIG. 1(b) shows a gate length of a read transistor constituting the pixel, and FIG. 1(a) shows a gate length of a read transistor constituting the reset current supply circuit.

FIG. 2 is a timing diagram describing the operation of the image sensor of the Embodiment 1, in which FIG. 2(a) shows an operation during normal luminance and FIG. 2(b) shows an operation during high luminance.

FIG. 4 is a diagram describing an image sensor of the Embodiment 2 of the present invention, in which FIG. 4(a) shows a configuration of a pixel and a configuration of a reset current supply circuit in the image sensor, and FIG. 4(b) schematically shows a shaded region in the pixel array of the image sensor.

FIG. 7 is a timing diagram describing the operation of an image sensor of the Embodiment 4, in which FIG. 7(a) shows an operation during normal luminance and FIG. 7(b) shows an operation during high luminance.

FIG. 9 is a diagram, a timing chart describing the operation of a conventional image sensor, in which FIG. 9(a) shows an operation during normal luminance and FIG. 9(b) shows an operation during high luminance.

Figure 1:
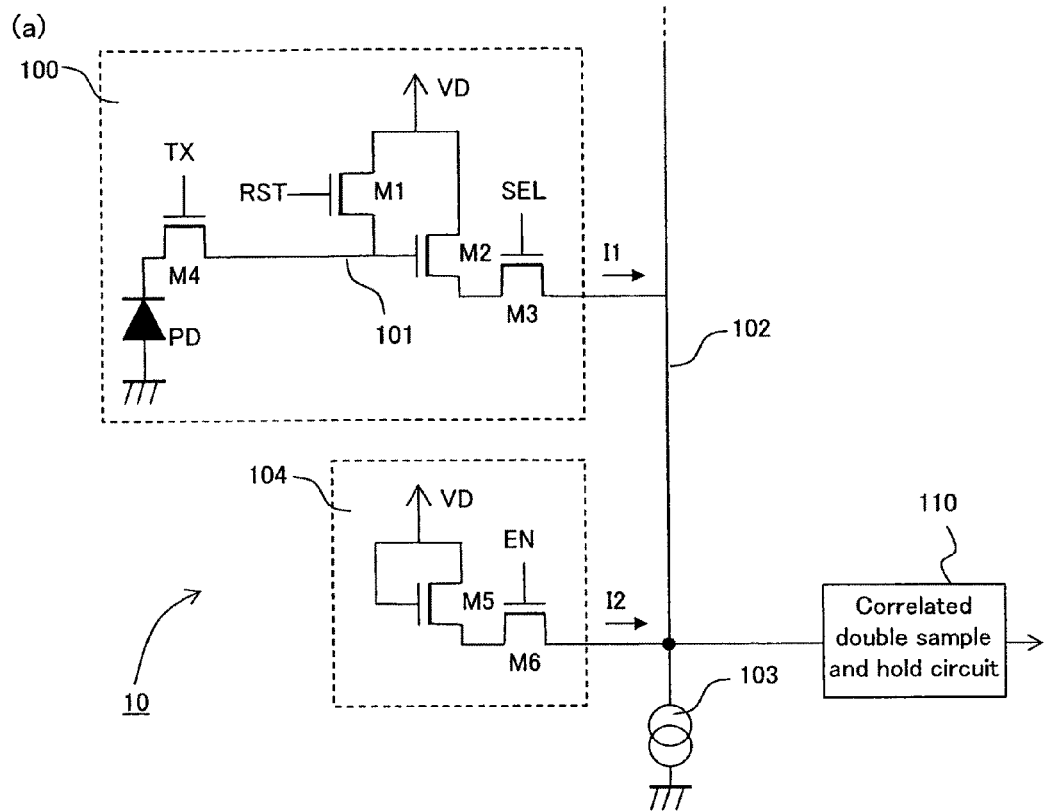
Figure 1:
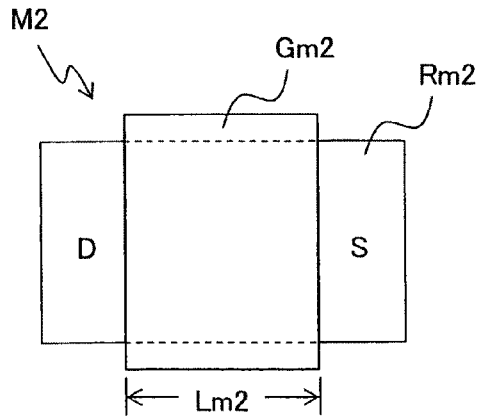
Figure 1:
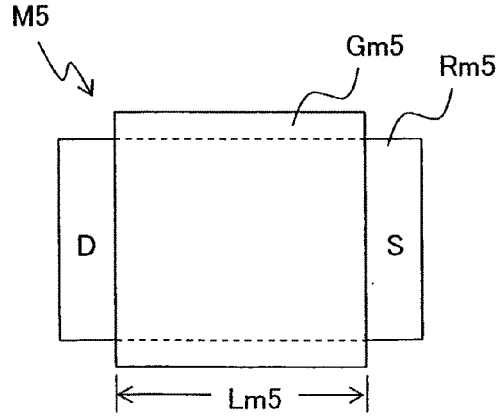

10, 10a, 10b, 10c image sensor
100, 110c, 200 pixel
100a, 100b dummy pixel
101 gate node of a read transistor
102 read line
103 constant-current source
104, 104a, 104b, 104c, 114a reset current supply circuit
110 correlated double sample and hold circuit
Gm2 gate of a first read transistor
Gm5 gate of a second read transistor
I1 pixel current
I2, I2a, I2b reset current
M1 reset transistor
M2 first read transistor
M3 first selecting transistor
M4 transmission transistor
M5 second read transistor
M6 second selecting transistor
PD photo diode

DESCRIPTION OF THE PREFERRED EMBODIMENTS

Embodiment 1

FIG. 1 is a diagram describing an image sensor of the Embodiment 1 of the present invention, in which FIG. 1(a) shows a circuit configuration of a pixel and a circuit configuration of a reset current supply section in the image sensor, FIG. 1(b) shows a gate length of the read transistor constituting the pixel, and FIG. 1(c) shows a gate length of the read transistor in the reset current supply section.

The pixel 100 constituting the image sensor 10 of the present Embodiment 1 has a four-transistor configuration. That is, the pixel 100 comprises a photo diode PD for converting light into electrons, a transmission transistor M4 for transmitting the charge generated at the photo diode PD wherein the TX signal is input to the gate, a read transistor M2 for amplifying the level of the charge and generating the signal voltage corresponding thereto, a reset transistor M1 for resetting the gate 101 of the read transistor M2 to the VD voltage, i.e., the high potential voltage (for example, source voltage) in the image sensor, and a selecting transistor M3 for transmitting the output of the read transistor M2 to the read line 102 wherein the SEL signal is input to the gate. To be exact, although the potential of the gate 101 of the read transistor M2 when reset (reset potential) is a potential lower than the source voltage by the amount of threshold voltage of the reset transistor M1, in the operational description, it is also referred to as the VD voltage at portions where there is no particular distinction needed between them.

Figure 10:
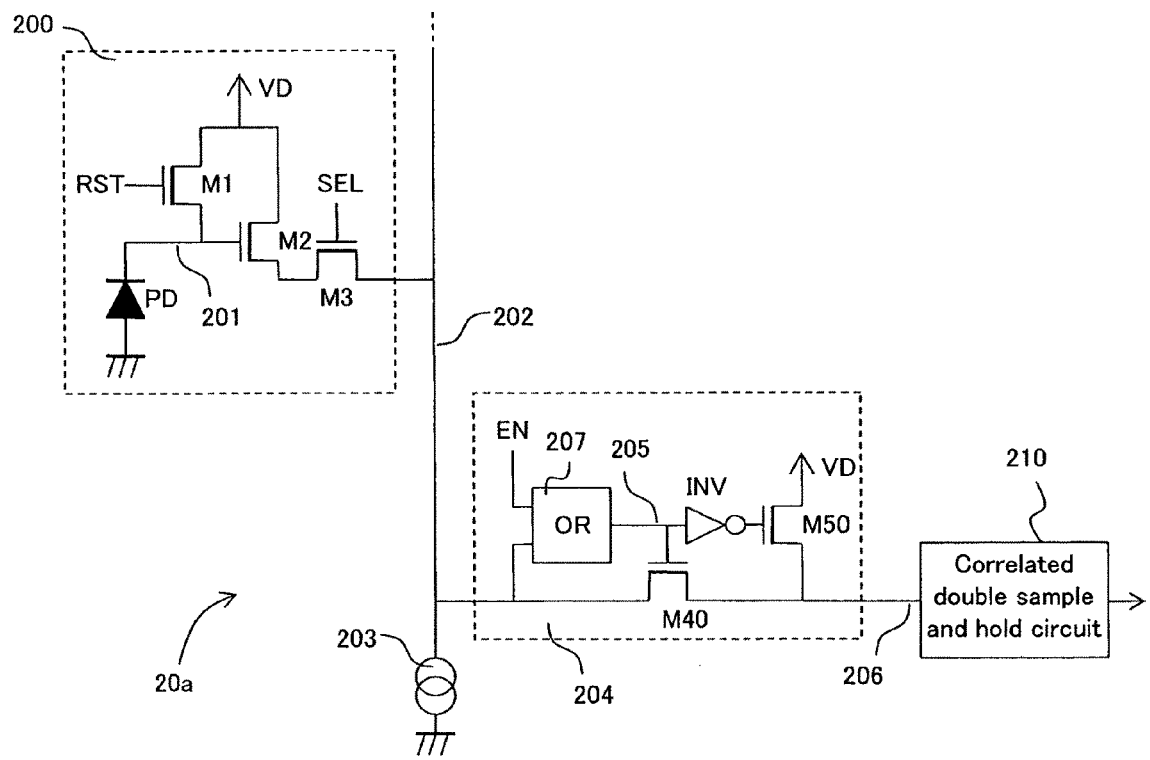
FIG. 10 is a diagram describing an image sensor disclosed in Reference 1.
Figure 11:
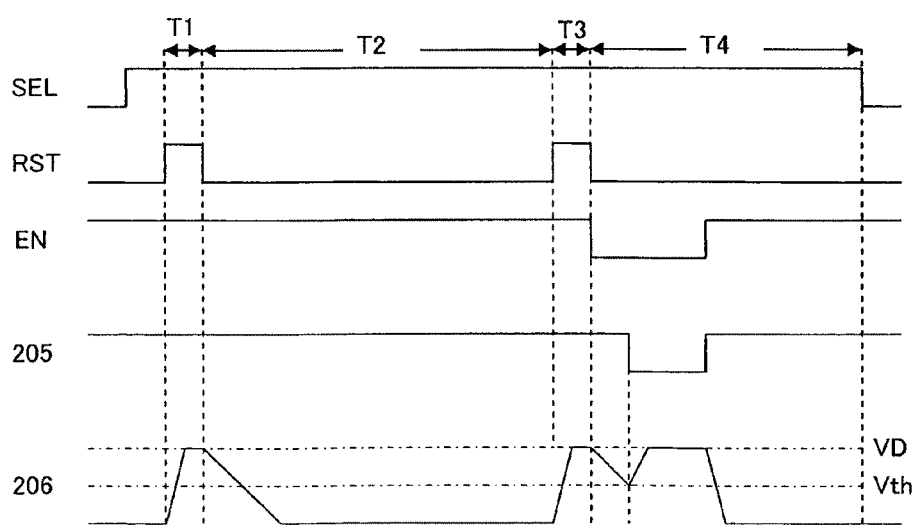
FIG. 11 is a timing diagram describing an operation of an image sensor disclosed in the Reference 1.

In the image sensor 10 of this Embodiment 1, a plurality of pixels 100 with such circuit configuration is arranged in a matrix, and a read line 102 is located for each pixel column. All pixels of one pixel column are connected to each read line 102, and each read line 102 is connected to one constant-current source 103 corresponding thereto. Moreover, a correlated double sample and hold circuit 110 for detecting a photo-detection signal (pixel signal) from the pixel is connected to each read line 102. This, for example, is a configuration same as that of the correlated double sample and hold circuit 210 in the conventional image sensor shown in FIGS. 8 and 10.

Moreover, a reset current supply circuit 104 for improving the quality of the images with a local high luminance is connected to each read line 102. This reset current supply circuit 104 comprises a read transistor M5 wherein the drain and the gate are connected to the source voltage VD, and a selecting transistor M6 connected between the source of the read transistor M5 and the read line 102 wherein the EN signal is input to the gate. The transistors M5 and M6 constituting the reset current supply circuit 104 are shaded.

Herein, the reset current supply circuit, when reading the reset voltage from the pixel to the read line, supplies a second reset current to the read line at the same time as a first reset current is supplied from the pixel to the read line, such that the sum of the first reset current and the second reset current is constant. A small transistor used in pixels can be used, and the increase in the chip size can be avoided.

In this embodiment, the gate length Lm5 (see FIG. 1(c)) of the read transistor M5 in the reset current supply circuit is longer than the gate length Lm2 (see FIG. 1(b)) of the read transistor M2 in the pixel. In FIG. 1(b), Rm2 is a diffusion area of the read transistor M2 constituting the pixel, and Gm2 is a gate electrode located on the diffusion area Rm2 through a gate insulating film (not shown). In FIG. 1(a), Rm5 is a diffusion area of the read transistor M5 constituting the pixel, and Gm5 is a gate electrode located on the diffusion area Rm5 through the gate insulating film (not shown).

In such configuration, when reading the reset voltage, a first reset current I1 is supplied from the pixel 100 and a second reset current I2 is supplied from the reset current supply circuit 104, respectively, to the read line 102. Since a constant-current source 103 is connected to the read line 102, the sum of the first rest current I1 and the reset current I2 is always constant.

The operation is described below.

Figure 2:
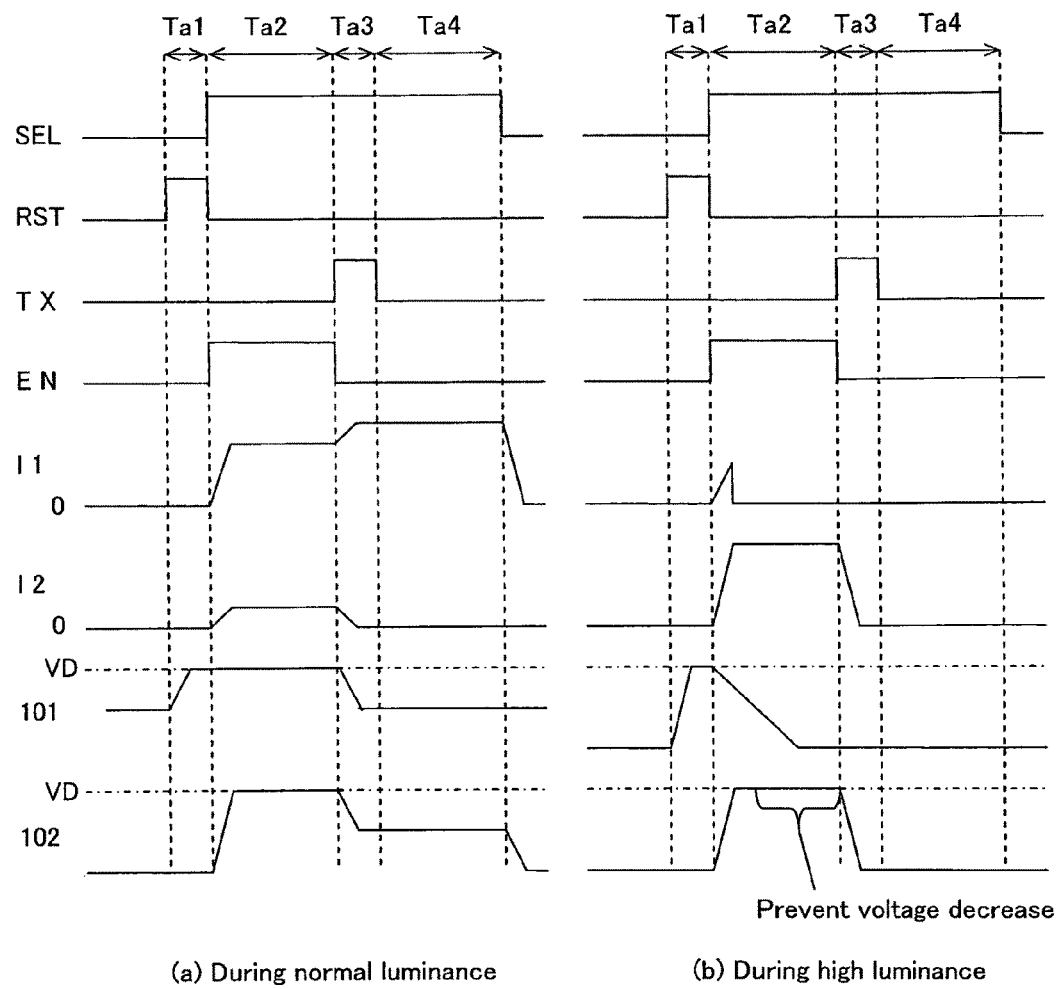

FIG. 2 is a timing diagram describing the operations of the pixel and the high luminance blackening suppression circuit, in which FIG. 2(a) shows an operation during normal luminance and FIG. 2(b) shows an operation during high luminance.

First, the operation during normal luminance is described with reference to FIG. 2(a).

For time period Ta1, when the RST signal is at an H level and the reset transistor M1 is turned on, the gate 101 of the read transistor M2 is at the VD voltage. In this case, the TX signal is held at a L level, and the transmission transistor M4 for transmitting the charge is turned off.

For time period Ta2, when the SEL signal for selecting the pixel is at an H level, the selecting transistor M3 is turned on, and the first reset current I1 is supplied from the VD voltage to the read line 102 through the read transistor M2 and the selecting transistor M3.

Moreover, for time period Ta2, the EN signal is at an H level, and the second reset current I2 is supplied from the reset current supply circuit 104 shown in FIG. 1(a) to the read line 102 through the read transistor M5 and the selecting transistor M6. Since the gates of both the read transistor M2 and the read transistor M5 are at the VD voltage, the voltage level of the read line 102 is at the VD voltage.

Since the gate length Lm5 of the read transistor M5 in the reset current supply circuit 104 is relatively longer than the gate length Lm2 of the read transistor M2 in the pixel 100, the first reset current I1 supplied from the pixel is dominant over the second reset current I2 supplied from the reset current supply circuit 104. Thus, the dispersion of the entire reset current due to the dispersion in the characteristics of the reset current supply circuit 104 can be suppressed.

Next, for time period Ta3, the TX signal is at an H level, and the transmission transistor M4 is turned on to read the charge generated at the photo diode PD in FIG. 1. Then, the voltage at gate 101 of the read transistor M2 drops from the VD voltage by the amount related to the charge generated at the photo diode. At this time, since the EN signal is at a L level and the second reset current I2 from the reset current supply circuit 104 is 0, the voltage level of the read line 102 follows the voltage of the gate 101 of the read transistor M2.

For time period Ta4, the TX signal is at a L level, and the transmission transistor M4 is turned off. Since the gate of the read transistor M2 is at the signal voltage, the voltage level of the read line 102 indicates the signal voltage.

By the difference between the reset voltage (VD voltage) read to the read line 102 in time period Ta2 described above and the signal voltage read to the read line 102 in time period Ta4 being detected at the correlated double sampling circuit 110, a pixel signal, that is, normally, a luminance signal, is output as the photo-detection signal.

Next, the operation during high luminance is described with reference to FIG. 2(b).

The feature of the operation during high luminance being different from the operation during normal luminance is an operation during the Ta2 time period described below.

That is, during high luminance, in time period Ta2, regardless that the transmission transistor M4 is turned off, electrons are injected to the gate 101 of the read transistor M2 through the PN diode formed by a P-type semiconductor substrate (P-SUB) and a N+-type semiconductor area formed in the substrate. Thus, the level of the gate 101 of the read transistor M2 suddenly drops from the VD voltage. Therefore, the read transistor M2 is in an OFF state, and the first reset current I1 from the pixel 100 is not generated. However, the second reset current I2 is output to the read line from the reset current supply circuit 104 to compensate for the first reset current I1 from the pixel. Since this is supplied to the constant-current source 103, the voltage level of the read line 102 is held at the VD voltage.

In this way, in the present embodiment, since the reset current supply circuit 104 is operated to prevent the reset voltage from dropping, a circuit for detecting the drop in the reset voltage as seen in the prior art is not needed. The dispersion in color in the high luminance subject caused by the detection threshold error can be suppressed.

Figure 12:
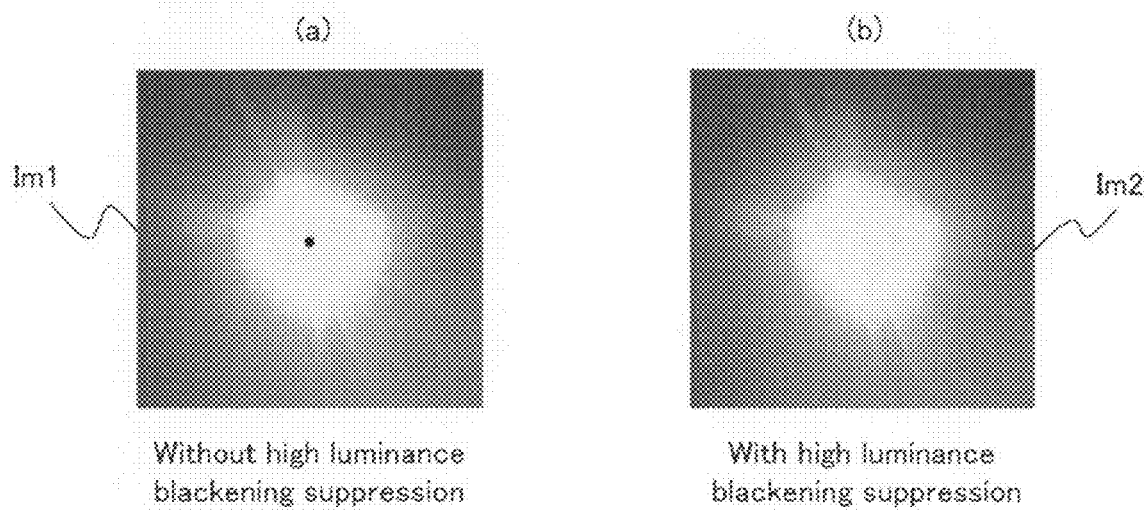
FIG. 12 is a diagram describing the effects of the present invention, in which the diagram shows an image of a sun when the reset current supply circuit is operated (Figure (b)) in comparison with an image of a sun when the reset current supply circuit is not operated (Figure (a)).

For example, when showing the effects of the reset current supply circuit of the present invention on the high luminance blackening with an exemplification of a sun image, the image of the sun is an image Im1 where the sun appears to be black as shown in FIG. 12(a) when the high luminance blackening suppression by the reset current supply current 104 is disabled, whereas the image of the sun is an image Im2 where the sun appears to be white as shown in FIG. 12(b) when the high luminance blackening suppression by the reset current supply current 104 is enabled.

Next, in time period Ta3, the EN signal of the selecting transistor M6 in the reset current supply circuit 104 shown in FIG. 1 is at a L level. Thus, the output current from the reset current supply circuit 104, i.e., the second reset current I2, is not generated. A path holding the VD voltage for the read line 102 does not exist, and the voltage level of the read line 102 is at the minimum voltage.

Then, for time period Ta4, the TX signal is at a L level, and the transmission transistor M4 is turned off. Since the gate of the read transistor M2 is at the minimum voltage, the voltage level of the read line 102 indicates the minimum voltage.

By the difference between the reset voltage (VD voltage) read to the read line 102 in time period Ta2 described above and the signal voltage read to the read line 102 in time period Ta4 (minimum voltage) being detected by the correlated double sampling circuit 110, a high luminance signal is output.

In this way, in the present Embodiment 1, in an image sensor comprising a plurality of pixels 100 arranged in a matrix and a read line 102 located for each pixel column for reading a signal voltage from the pixel of each pixel column, the image sensor comprises a reset current supply circuit 104 for supplying a second reset current I2 for each read line 102, wherein when reading the reset voltage in the pixel, the sum of the first reset current I1 supplied from the pixel to the read line 102 and the second reset current I2 supplied from the reset current supply circuit 104 to the read line 102 is constant. Thus, even if the first reset current I1 from the pixel changes, the sum of the reset current supplied to the read line (I1+I2) is held constant. Therefore, due to the incidence of strong light to the transistor constituting the pixel during high luminance, even if the first reset current from the pixel suddenly drops, the second reset current is supplied from the reset current supply circuit 104 to the read line, and during the reset voltage read time period, the decrease in reset voltage can be avoided. As a result, the difference between the signal voltage and the reset voltage becomes small during high luminance, and the phenomenon of the high luminance subject blackening can be prevented.

In the present Embodiment 1, since the reset current supply circuit 104 operates such that the reset voltage does not decrease, a circuit for detecting the decrease in reset voltage which is seen in the prior art is not needed. The dispersion in colors in the high luminance subject caused by the detection threshold error can be suppressed.

In the present Embodiment 1, the gate length Lm5 of the read transistor M5 in the reset current supply circuit is longer than the gate length Lm2 of the read transistor M2 in the pixel. Thus, the threshold value and channel resistance of the read transistor M5 in the reset current supply circuit 104 are larger than that of the read transistor M2 in the pixel. Therefore, in the reset time period during normal luminance, the first reset current I1 from the pixel is dominant over the second reset current I2 from the reset current supply circuit. Thus, the dispersion of the reset current due to the dispersion in the characteristics of the reset current supply circuit can be suppressed. As a result, the dispersion of color in the high luminance subject due to the manufacturing dispersion in transistor threshold value in the reset current supply circuit can be even more alleviated.

In the aforementioned Embodiment 1, the reset current supply circuit 104 is configured to connect the gate and the drain of the read transistor M5 to the VD voltage, and the EN signal to be input to the gate of the selecting transistor M6. However, the circuit configuration of the reset current supply circuit 104 is not limited hereto.

Figure 3:
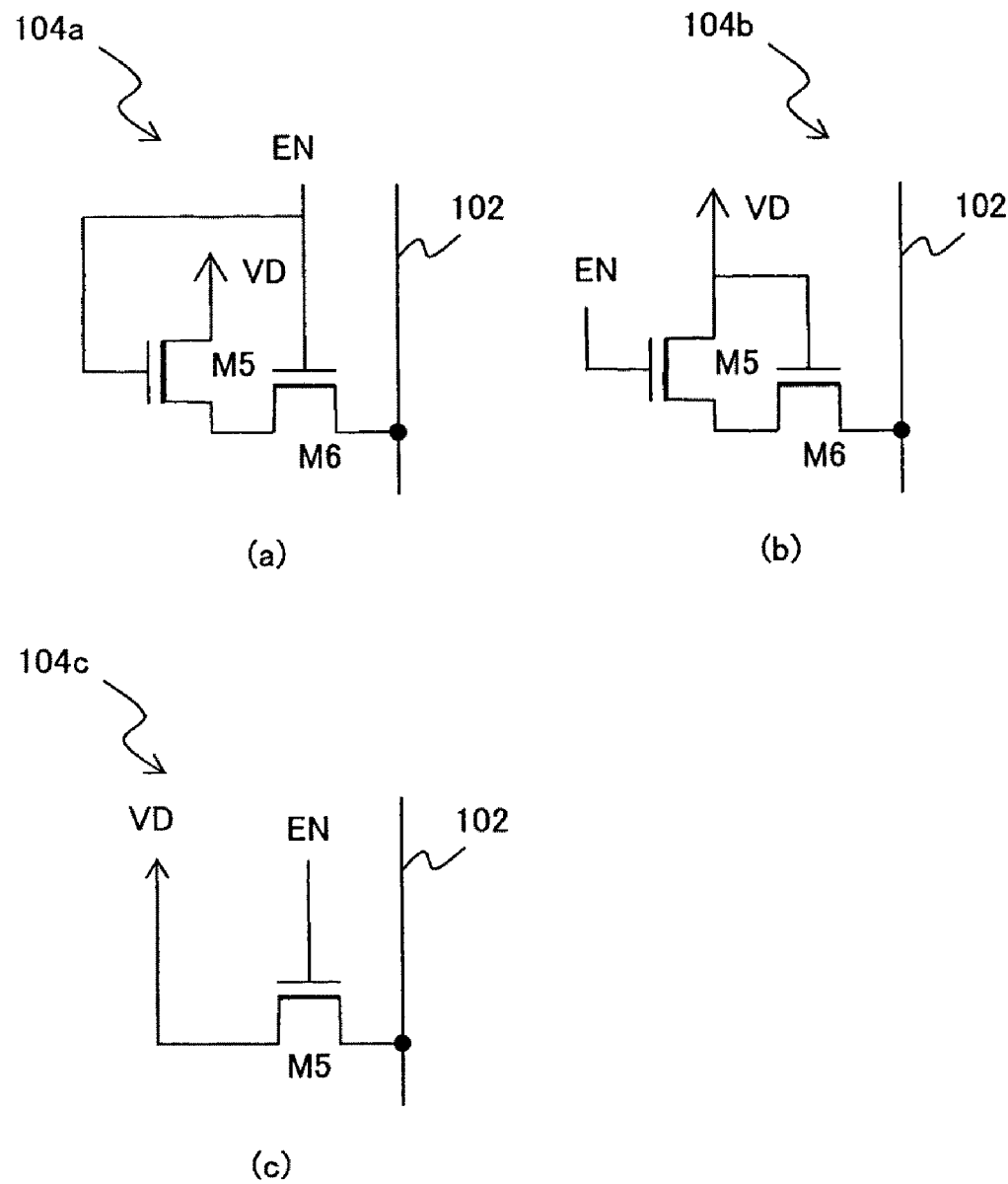
FIG. 3 is a diagram showing three variation examples (Figures (a), (b) and (c)) of a reset current supply circuit in the image sensor of the Embodiment 3.

For example, FIG. 3(a) shows a reset current supply circuit 104a in which the circuit configuration is different from the reset current supply circuit 104 of Embodiment 1.

The reset current supply circuit 104a, similar to Embodiment 1, comprises a read transistor M5 and a selecting transistor M6. However, in this circuit 104a, the VD level is connected only to the drain of the transistor M5, and the EN signal is input to the gates of the transistors M5 and M6.

Accordingly, if H level of the EN signal is made equal to the VD voltage, the reset current supply circuit 104a performs a function exactly the same as the reset current supply circuit 104 of Embodiment 1.

That is, even in the reset current supply circuit 104a of such configuration, only for the time period Ta2 for reading the reset voltage in which the EN signal is at an H level (see FIGS. 2(a) and 2(b)), the second reset current I2 is supplied to the read line 102 such that the sum of the second reset current I2 and the first reset current I1 output from the pixel is constant. Therefore, even if the first reset current I1 from the pixel suddenly drops during high luminance, the total amount of the reset current supplied to the read line 102 can be held constant. As a result, the blackening phenomenon of the subject which is supposed to be white being black when photographing the high luminance subject can be avoided.

FIG. 3(b) shows a reset current supply circuit 104b as another example having a circuit configuration which is different from the reset current supply circuit 104 of Embodiment 1.

The reset current supply circuit 104b, also similar to Embodiment 1, comprises a read transistor M5 and a selecting transistor M6. However, in this circuit 104b, the VD level is connected to the drain of the read transistor M5 and the gate of the selecting transistor M6, and the EN signal is input to the gate of the transistor M5.

Herein, if the H level of the EN signal is made equal to the VD voltage, the reset current supply circuit 104b performs a function exactly the same as the reset current supply circuit 104 of Embodiment 1.

Even in the reset current supply circuit 104b of such configuration, only for the time period T2 for reading the reset voltage in which the EN signal is at an H level (see FIGS. 2(a) and 2(b)), the second reset current I2 is supplied to the read line 102 such that the sum of the second reset current I2 and the first reset current I1 output from the pixel is constant. Therefore, even if the first reset current I1 from the pixel suddenly drops during high luminance, the total amount of the reset current supplied to the read line 102 can be held constant. As a result, the blackening phenomenon of the subject which is supposed to be white being black when photographing the high luminance subject can be avoided.

FIG. 3(c) shows a reset current supply circuit 104c as another example having a circuit configuration which is different from the reset current supply circuit 104 of Embodiment 1.

The reset current supply circuit 104c is different from Embodiment 1. It is constituted only from a read transistor M5 connected between the VD level and the read line 102, and the EN signal is input to the gate thereof.

Herein, if the H level of the EN signal is made equal to the VD voltage, the reset current supply circuit 104c, similar to the reset current supply circuit 104 of Embodiment 1, only for the time period T2 for reading the reset voltage in which the EN signal is at the H level (see FIGS. 2(a) and 2(b)), supplies the second reset current to the read line 102 such that the sum of the second reset current and the first reset current I1 output from the pixel is constant.

In this way, the reset current supply circuit for supplying current such that the reset voltage does not decrease can be realized with various circuit configurations. In any combination of the transistor, a read transistor in which the reset voltage is connected to the gate is needed.

Although the aforementioned Embodiment 1 shows an image sensor comprising a reset current supply circuit with a circuit configuration different from the pixel for each read line, the reset current supply circuit can be configured by a dummy pixel with a circuit element same as the pixel or a dummy pixel with a circuit element partially same as the pixel. An image sensor with such configuration is described below.

Embodiment 2

Figure 4:
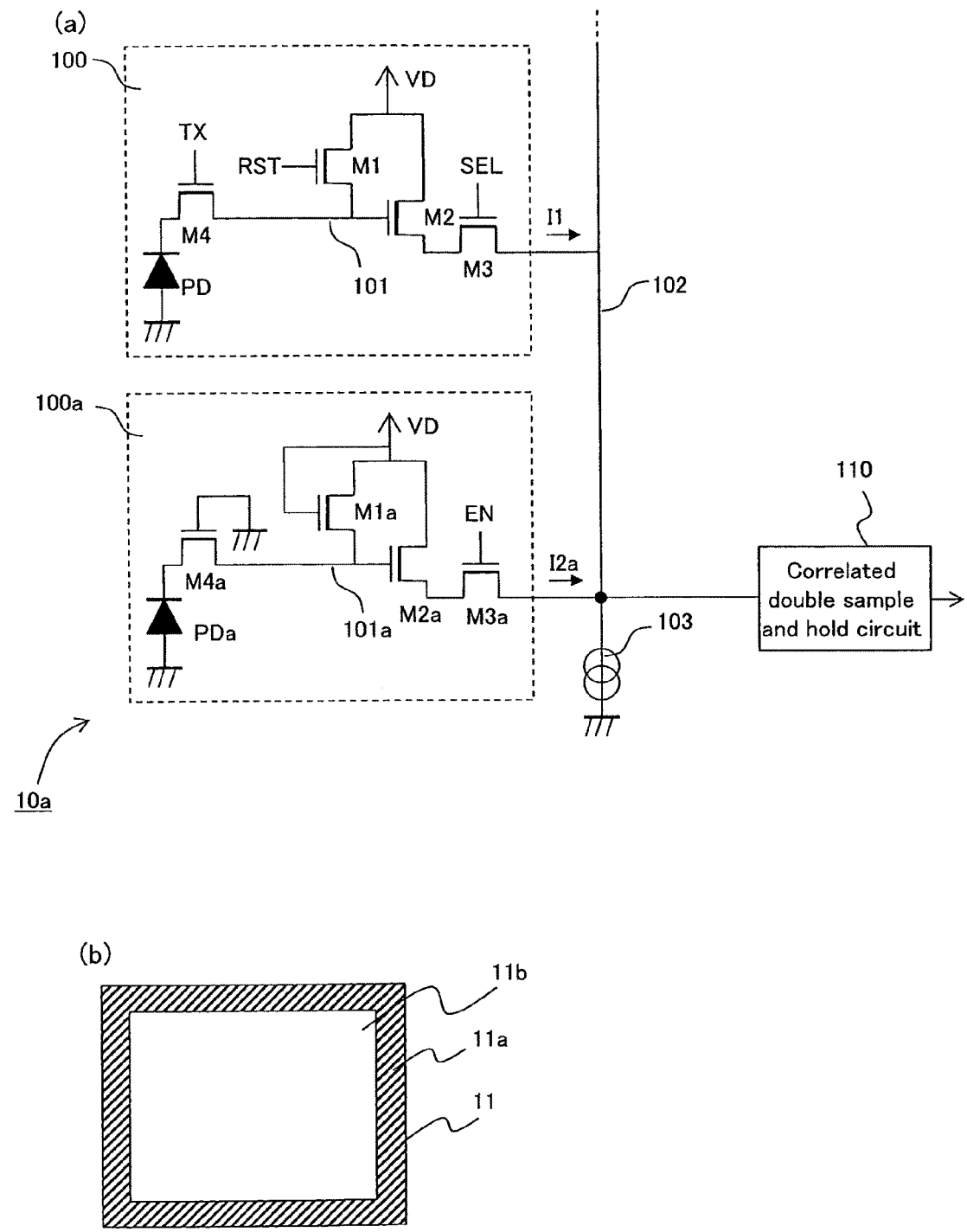

FIG. 4 is a diagram describing an image sensor of the Embodiment 2 of the present invention, in which FIG. 4(a) shows a configuration of a pixel and a configuration of a reset current supply circuit in the image sensor, and FIG. 4(b) schematically shows a shaded region in the pixel array of the image sensor.

The image sensor 10a of the Embodiment 2 uses a dummy pixel 10a instead of the reset current supply circuit 104 in the image sensor 10 of Embodiment 1.

That is, in the image sensor in the Embodiment 2, as shown in FIG. 4(b), pixels for one row located in the shaded area 11a at the upper part or the lower part of the space is used as the reset current supply circuit for supplying the reset current to each read line. Moreover, 11b in the diagram is a light receiving part of an image sensor in the unshaded pixel column area.

This dummy pixel 100a, similar to the pixel 100, comprises a photo diode PDa, a reset transistor M1a, a read transistor M2a, a selecting transistor M3a, and a transmission transistor M4a. However, in the dummy pixel 100a, the gate of the reset transistor M1a is connected to the VD voltage, and an EN signal which is a control signal at an H level only for the reading time period of the reset voltage is input to the gate of the selecting transistor M3a instead of the SEL signal for selecting the pixel. The gate of the transmission transistor M4a is fixed to a L level (for example, ground voltage).

Even in the image sensor 10a of Embodiment 2 of such configuration, only for the time period Ta2 for reading the reset voltage in which the EN signal is at an H level (see FIGS. 2(a) and 2(b)), the reset current supply circuit 10a constituted of dummy pixel supplies the second reset current I2a to the read line 102 such that the sum of the second reset current I2a and the first reset current I1 output from the pixel is constant. Therefore, even if the reset current I1 from the pixel suddenly drops during high luminance, the total amount of the reset current supplied to the read line 102 can be held constant. As a result, the blackening phenomenon of the subject which is supposed to be white being black when photographing the high luminance subject can be avoided.

Embodiment 3

Figure 5:
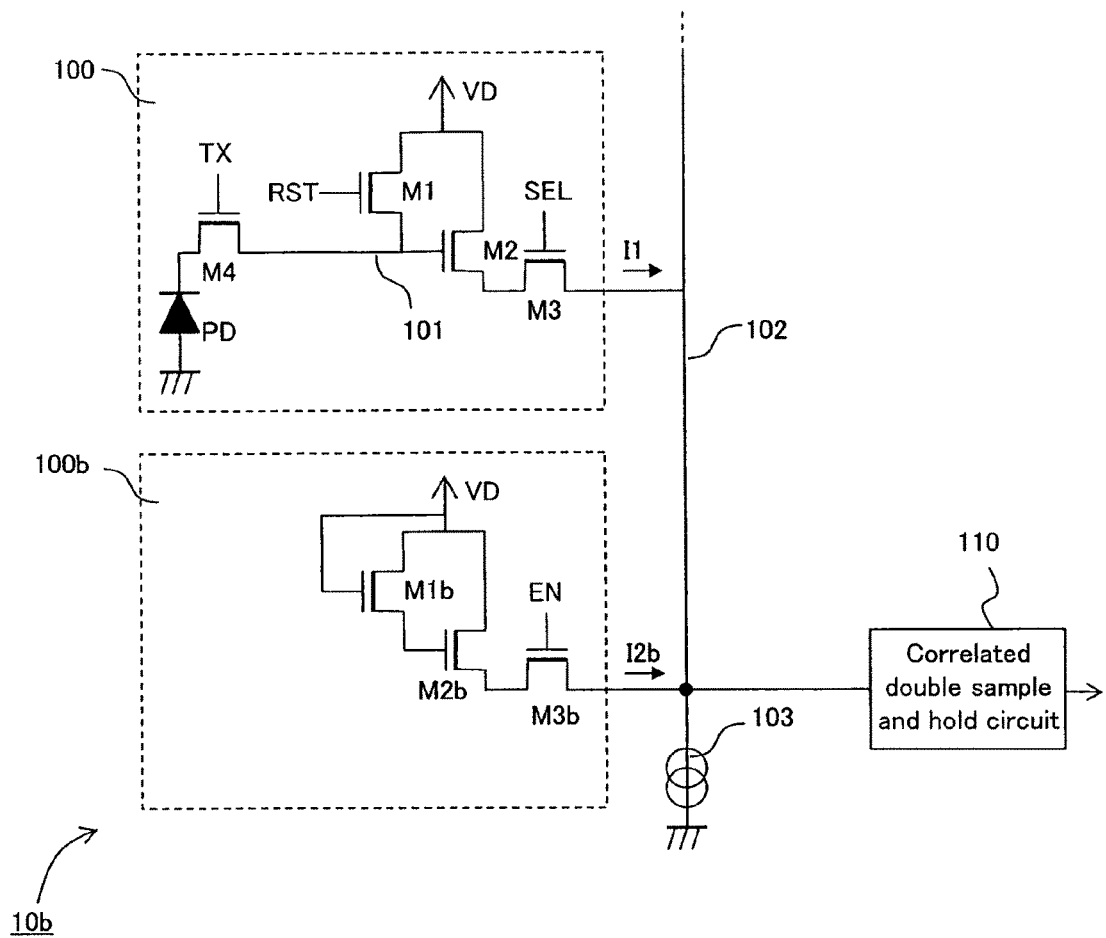
FIG. 5 is a diagram describing an image sensor of the Embodiment 3 of the present invention, in which the diagram shows a configuration of a pixel and a configuration of a reset current supply circuit in the image sensor.

FIG. 5 is a diagram describing an image sensor of the Embodiment 3 of the present invention, in which the diagram shows a configuration of a pixel and a configuration of a reset current supply circuit in the image sensor.

The image sensor 10b of the Embodiment 3, similar to the image sensor 10a of the Embodiment 2, uses a dummy pixel 100b located in the shaded portion of the pixel array instead of the reset current supply circuit 104 in the image sensor 10 of Embodiment 1. However, in the dummy pixel 100b in this Embodiment 3, the elements are not formed in the area where the transmission transistor M4 and the photo diode PD are to be formed in the pixel.

That is, the dummy pixel 10b comprises a reset transistor M1b, a read transistor M2b and a selecting transistor M3b. In this dummy pixel 100b, similar to the dummy pixel 100a of the Embodiment 2, the gate of the reset transistor M1b is connected to the VD source, and an EN signal which is a control signal at an H level only for the reading time period of the reset voltage is input to the gate of the selecting transistor M3b instead of the SEL signal for selecting the pixel.

Even in the image sensor 10b of Embodiment 3 of such configuration, only for the time period Ta2 for reading the reset voltage in which the EN signal is at H level (see FIGS. 2(a) and 2(b)), the reset current supply circuit 10b constituted of dummy pixel 100b supplies the second reset current I2b to the read line 102 such that the sum of the second reset current I2a and the first reset current I1 output from the pixel is constant. Therefore, even if the reset current I1 from the pixel suddenly drops during high luminance, the total amount of the reset current supplied to the read line 102 can be held constant. As a result, the blackening phenomenon of the subject which is supposed to be white being black when photographing the high luminance subject can be avoided.

Embodiment 4

Figure 6:
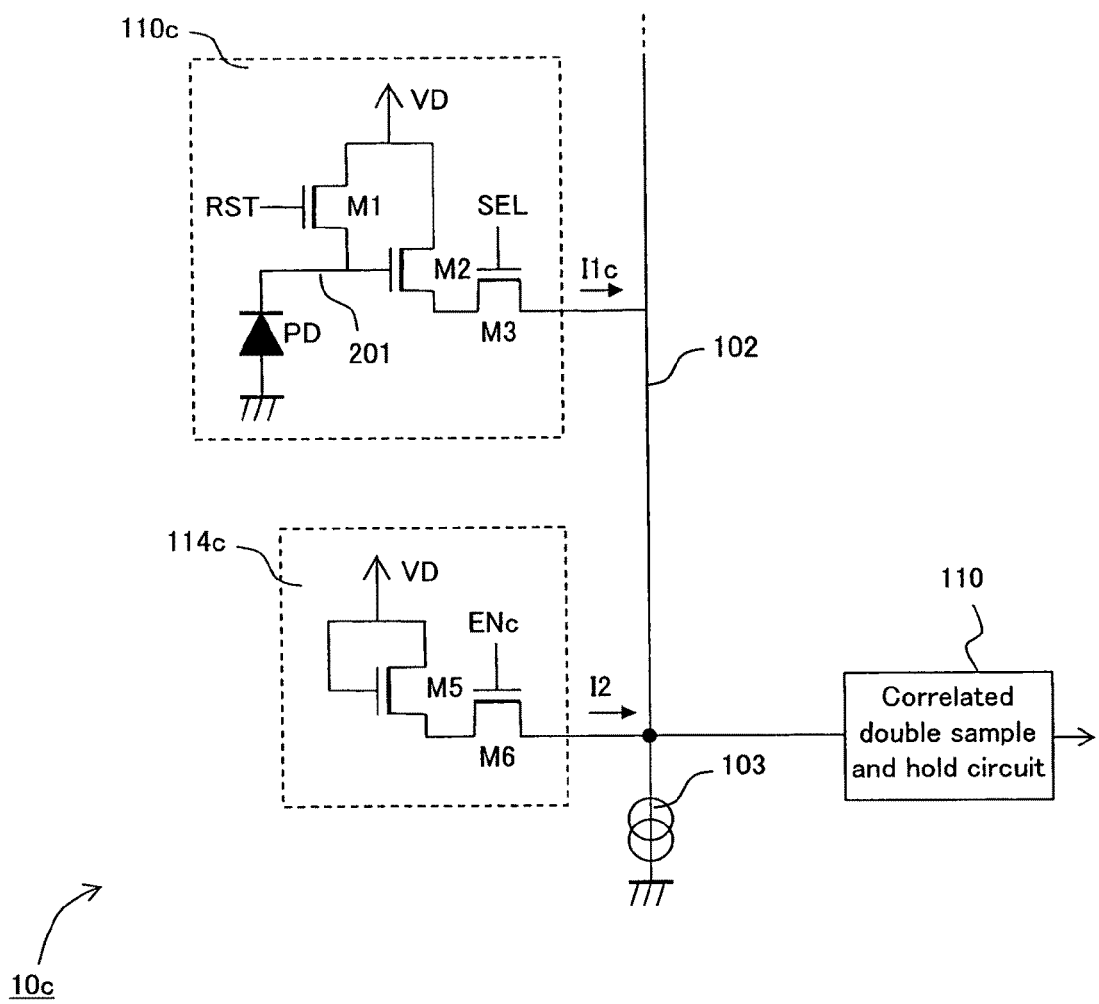
FIG. 6 is a diagram describing an image sensor of the Embodiment 4 of the present invention, in which the diagram shows a configuration of a pixel and a configuration of a reset current supply circuit in the image sensor.
Figure 7:
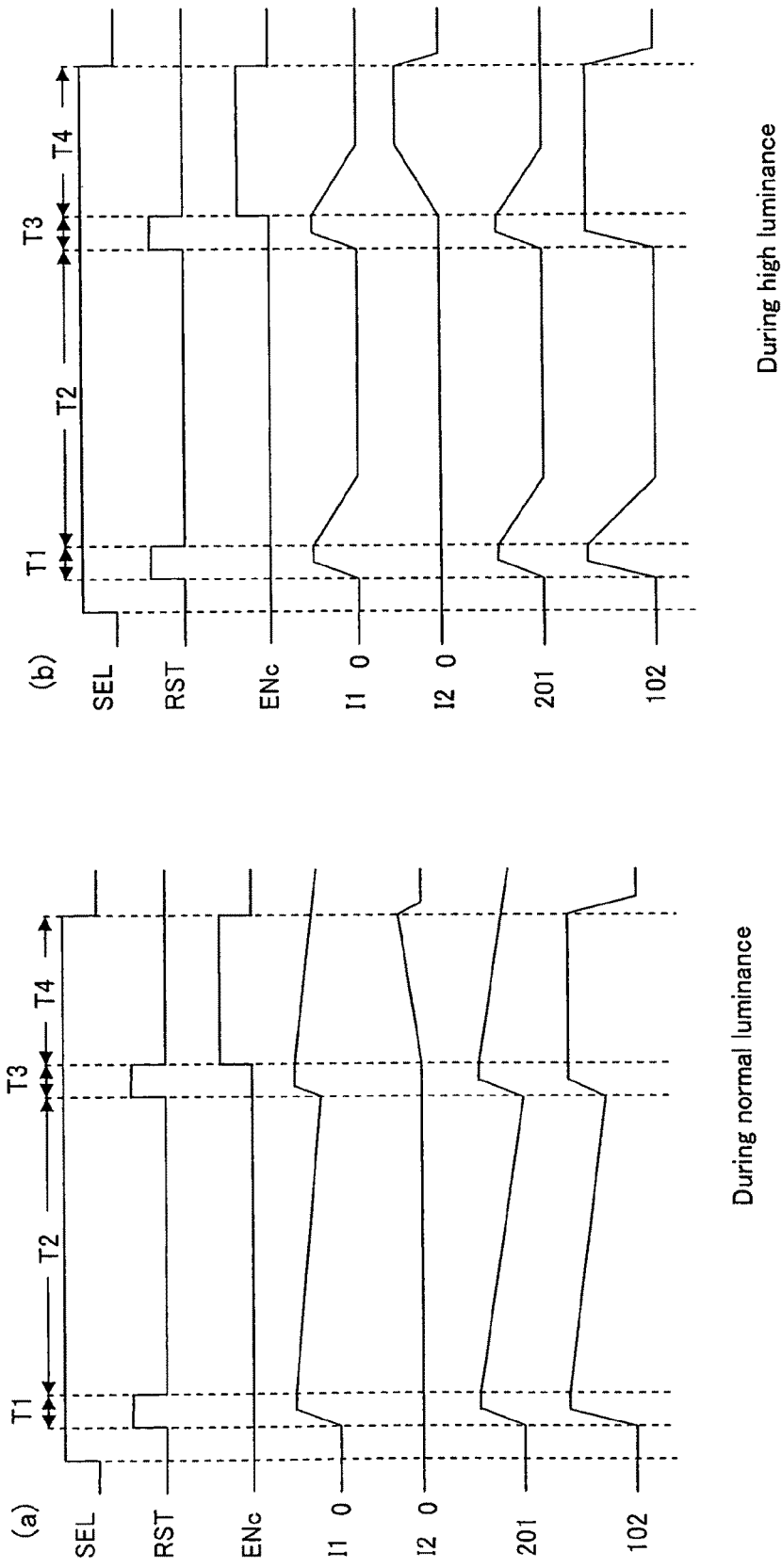

FIG. 6 is a diagram describing an image sensor of the Embodiment 4 of the present invention, in which the diagram shows a circuit configuration of a pixel and a configuration of a reset current supply circuit in the image sensor. FIG. 7 is a timing diagram describing the operation of the image sensor.

The image sensor 10c of the Embodiment 4 has a three transistor configuration of a pixel instead of the four transistor configuration in the image sensor 10 in the Embodiment 1.

Figure 8:
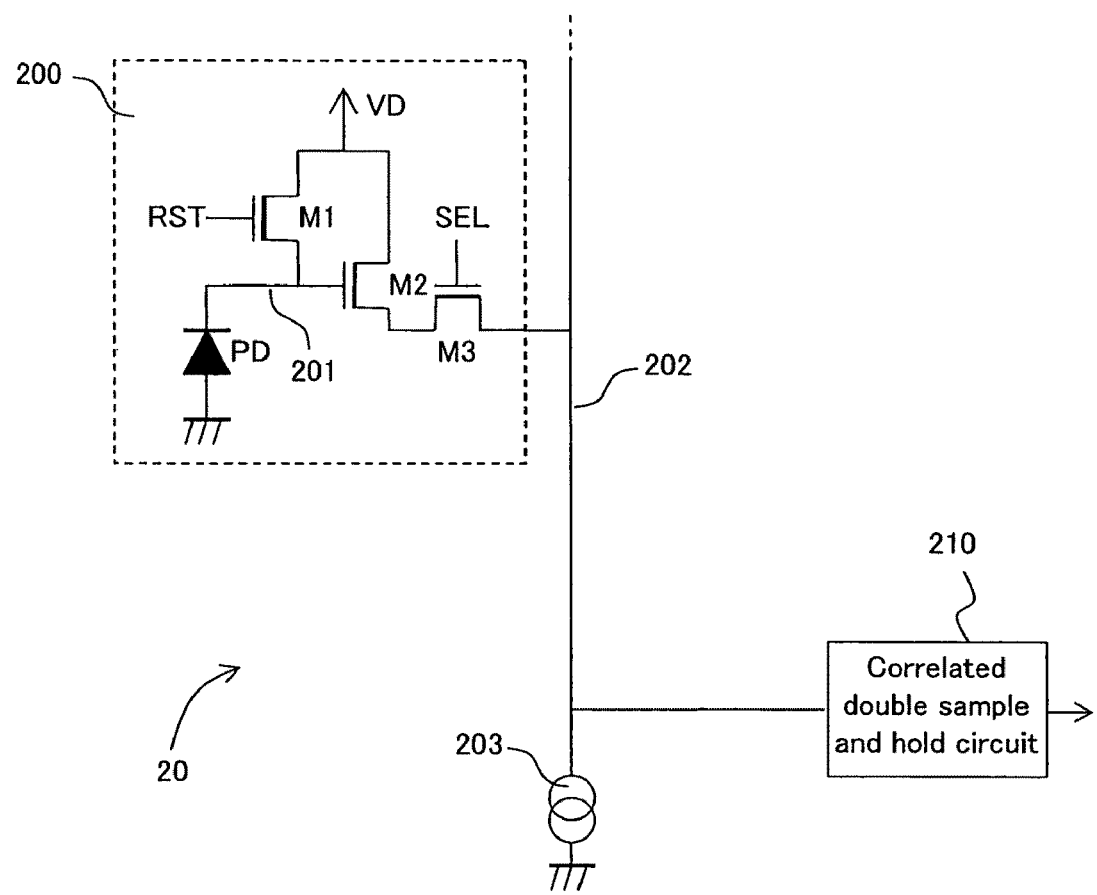
FIG. 8 is a diagram describing a conventional image sensor, in which the diagram shows a configuration of a pixel in an image sensor.
Figure 9:
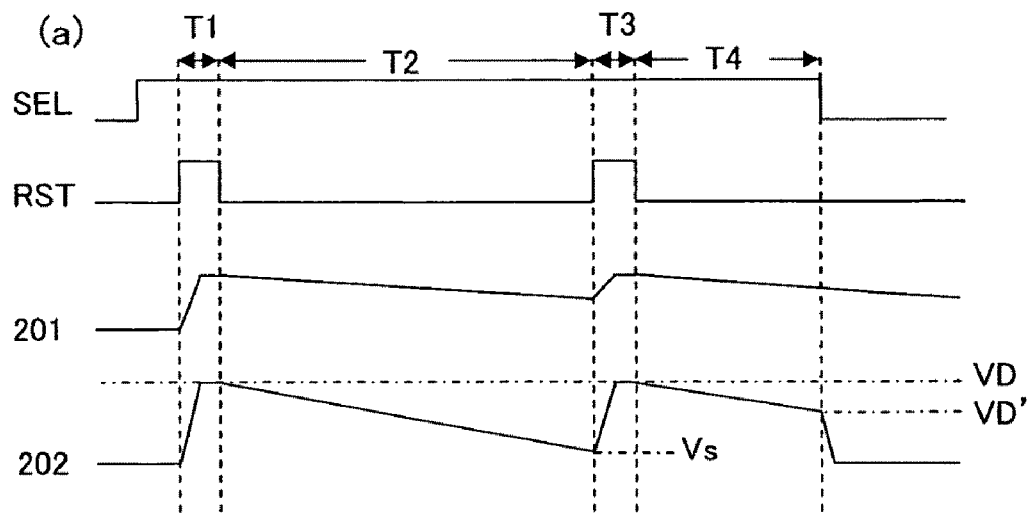
Figure 9:
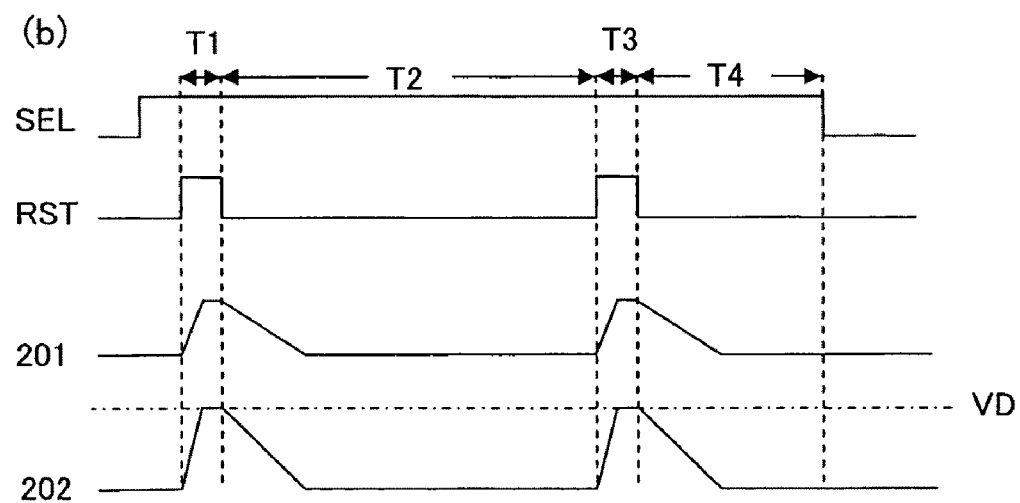

That is, the pixel 110c constituting the image sensor of the Embodiment 4 is same as the pixel 200 constituting the conventional image sensor 20 shown in FIG. 8. The pixel 110c comprises a photo diode PD, a reset transistor M1, a read transistor M2 and a selecting transistor M3, wherein a RST signal for resetting the cathode voltage of the photo diode PD is input to the gate of the reset transistor M1, and a SEL signal for selecting the pixel is input to the gate of the selecting transistor M3.

The reset current supply circuit 114a, similar to the one in Embodiment 1, comprises a read transistor M5 wherein the drain and the gate are connected to the source voltage VD, and a selecting transistor M6 connected between the source of the read transistor M5 and the read line 102. In this Embodiment 4, a control signal ENc which conducts the selecting transistor M6 is input to the gate of the selecting transistor M6 only for the time period for reading the reset voltage to the read line.

Moreover, in this Embodiment 4, the gate length Lm5 of the read transistor M5 in the reset current supply circuit 114c (see FIG. 1(a)) is longer than the gate length Lm2 of the read transistor M2 in the pixel 110c (see FIG. 1(b)).

Other configurations in the image sensor 10c of this Embodiment 4 are the same as those of the image sensor 10 in the Embodiment 1.

In an image sensor 10c with such configuration, when reading the reset voltage, a first reset current I1c is supplied from the pixel 100c and a second reset current I2 is supplied from the reset current supply circuit 114a, respectively, to the read line 102. Since a constant-current source 103 is connected to the read line 102, the sum of the aforementioned current I1c and the current I2 is always constant.

Next, the operation is described below.

FIG. 7 is a timing diagram describing the operations of the pixel and the high luminance blackening suppression circuit, in which FIG. 7(a) shows an operation during normal luminance and FIG. 7(b) shows an operation during high luminance.

First, the operation during normal luminance is described with reference to FIG. 7(a).

When the SEL signal is at an H level and the selecting transistor M3 is conducted, the pixel is selected. Then, in the first reset time period T1, by the RST signal being at an H level and the reset transistor M1 shown in FIG. 6 being turned on, the gate 201 of the read transistor M2 is at the VD voltage. Since the SEL signal is at H level, the selecting transistor M3 is in an ON state. Thus, the level of the read line 102 is at the VD voltage.

In the integral time period T2 thereafter, RST signal is at a L level, and the reset transistor M1 is turned off. Thus, due to the charge generated by the photo diode PD, the voltage of the gate 201 of the read transistor M2 decreases, and the pixel voltage read to the read line 102 also gradually decreases.

The correlated double sampling circuit 110 samples and holds the pixel voltage Vs read to the read line 102 as a signal voltage just before the end of the integral time period T2.

After the second reset operation is performed in time period T3, in the time period T4 which is shorter than the integral time period T2, the ENc signal is at an H level, the second reset current is supplied from the reset current supply circuit 114c to the read line 102, and the read line 102 is held at the VD level. The correlated double sampling circuit 110 samples and holds the pixel voltage read to the read line 102 as a reset voltage in the time period T4.

The sample and hold circuit outputs the voltage difference between the signal voltage which was sampled and held in the integral time period T2 after the first reset operation and the reset voltage which was sampled and held in the short reset voltage read time period T4 after the second reset operation, as a photo-detection signal (pixel signal) detected at the pixel.

In this way, by outputting the difference between the two sample and hold voltages, a reset noise is removed from the pixel signal read from the pixel.

Next, the operation during high luminance is described with reference to FIG. 7(b).

When the SEL signal is at an H level and the selecting transistor M3 is conducted, the pixel is selected. Then, in the first reset time period T1, by the RST signal being at H level and the reset transistor M1 being turned on, the gate 201 of the read transistor M2 is at the VD voltage. Since the SEL signal is at the H level, the selecting transistor M3 is in an ON state. Thus, the level of the read line 102 is at the VD voltage.

In the integral time period T2 thereafter, RST signal is at a L level, and the reset transistor M1 is turned off. Thus, during high luminance, due to the current generated by the photo diode PD, the voltage of the gate 201 of the read transistor M2 suddenly decreases.

The correlated double sampling circuit 110 samples and holds the pixel voltage read to the read line 102, i.e., the minimum voltage, as a signal voltage just before the end of the integral time period T2.

Next, the second reset operation is performed in time period T3, and in the time period T4 thereafter, the RST signal is at a L level. Thus, the reset transistor M1 is turned off. Then, during high luminance, due to the current generated by the photo diode PD, the voltage of the gate 201 of the read transistor M2 suddenly decreases, and the current I1$c$ supplied to the read line 102 also suddenly decreases from the maximum level in the reset time period T3. However, in the time period T4 after the second reset operation, different from the time period T2 after the first reset operation, the EN signal is at an H level. The second reset current I2 is supplied from the reset current supply circuit 114$c$ to the read line 102 such that the sum of the second reset current I2 and the first reset current I1$c$ is constant. Thus, the level of the read line 102 is held at the VD voltage.

Therefore, the correlated double sampling circuit 110 samples and holds the VD voltage read to the read line 102 as a reset voltage.

In this way, the difference between the signal voltage which is the output signal 206 generated in integral time period T2 (minimum voltage) and the reset voltage which is the output signal 206 generated in time period T4 (VD voltage) is detected at the correlated double sampling circuit 210, and the correct pixel signal during high luminance is output.

In this way, in the present Embodiment 4, in an image sensor comprising a plurality of pixels 10$c$ arranged in a matrix and a read line 102 located for each pixel column for reading a signal voltage from the pixel of each pixel column, the image sensor comprises a reset current supply circuit 104$a$ for supplying a reset current I2 for each read line 102, wherein when reading the reset voltage in the pixel, the sum of the first reset current I1$c$ supplied from the pixel to the read line 102 and the second reset current I2 supplied from the reset current supply circuit 114$c$ to the read line 102 is constant. Thus, even if the first reset current I1$c$ from the pixel changes, the total amount of the reset current supplied to the read line 102 (I1$c$+I2) is held constant. Therefore, due to the incidence of strong light to the transistor constituting the pixel during high luminance, even if the reset current from the pixel suddenly drops, the reset current is supplied from the reset current supply circuit 104 to the read line. Thus, during the reset voltage read time period, the decrease in reset voltage can be avoided. As a result, the difference between the signal voltage and the reset voltage becomes small during high luminance, and the phenomenon of the high luminance subject blackening can be prevented.

In the present Embodiment 4, similar to the Embodiment 1, in the time period for reading the reset voltage, since the reset current supply circuit 114$c$ supplies the second reset current I2 to the read line 102 such that the reset voltage does not drop, a circuit for detecting the drop in the reset voltage as seen in the prior art is not needed. The dispersion in color in the high luminance subject caused by the detection threshold error can be suppressed.

In the present Embodiment 4, the gate length of the read transistor M5 in the reset current supply circuit is longer than the gate length of the read transistor M2 in the pixel. Thus, similar to the Embodiment 1, in the reset time period during normal luminance, the reset current I1$c$ from the pixel is dominant over the reset current I2 from the reset current supply circuit. The dispersion of the reset current due to the dispersion in the characteristics of the reset current supply circuit can be suppressed. As a result, the dispersion of color in the high luminance subject due to the manufacturing dispersion in transistor threshold value in the reset current supply circuit can be even more alleviated.

In the Embodiment 4, this reset current supply circuit 114$c$ is configured to connect the gate and the drain of the read transistor M5 to the VD voltage, and the EN signal to be input to the gate of the selecting transistor M6. However, the circuit configuration of the reset current supply circuit 114$a$ is not limited hereto. Instead, a reset current supply circuit 104$a$ shown in FIG. 3($a$), a reset current supply circuit 104$b$ shown in FIG. 3($b$), and a reset current supply circuit 104$c$ shown in FIG. 3($c$) may be used.

In the aforementioned Embodiment 4, an image sensor comprising a reset current supply circuit with a circuit configuration different from the pixel for each read line is shown, wherein the reset current supply circuit can be configured by a dummy pixel with a circuit element same as the pixel or a dummy pixel with a circuit element partially same as the pixel, as described in the Embodiment 1.

For example, the reset current supply circuit in the Embodiment 4, similar to the pixel 10$c$, may be a dummy pixel comprising a photo diode PD, a reset transistor M1, a read transistor M2 and a selecting transistor M3, wherein the gate of the reset transistor M1 is connected to the VD voltage, and the ENc signal which is at H level only in the reading time period of the reset voltage is input to the gate of the selecting transistor M3 instead of the SEL signal for selecting the pixel.

Moreover, in the dummy pixel, it is obvious that the read transistor M2 and the selecting transistor M3 are serially connected between the VD voltage and the read line, the gate of the read transistor M2 at the VD voltage side is connected to the cathode of the photo diode PD, and the reset transistor M1 is connected between the VD source and the gate of the read transistor M2.

The reset current supply circuit in the Embodiment 4 may be a dummy pixel excluding the photo diode in the dummy pixel described above, comprising three transistors constituting the pixel, i.e., the reset transistor M1, the read transistor M2 and the selecting transistor M3, wherein the gate of the reset transistor M1 is connected to the VD voltage, and the ENc signal which is at an H level only in the reading time period of the reset voltage is input to the gate of the selecting transistor M3 instead of the SEL signal for selecting the pixel. Moreover, in the dummy pixel, it is obvious that the read transistor M2 and the selecting transistor M3 are serially connected between the VD voltage and the read line, and the reset transistor M1 is connected between the VD source and the gate of the read transistor M2.

In addition, though not specifically described in the Embodiments 1-4 described above, an electronic information device will be described below, wherein the electronic information device comprises a digital camera (e.g., digital video camera, digital still camera), an image input camera, and an image input device (e.g., scanner, facsimile, and cell phone device equipped with a camera) using any of at least the image sensors according to Embodiments 1-4 described above in an image capturing section.

Embodiment 5

Figure 13:
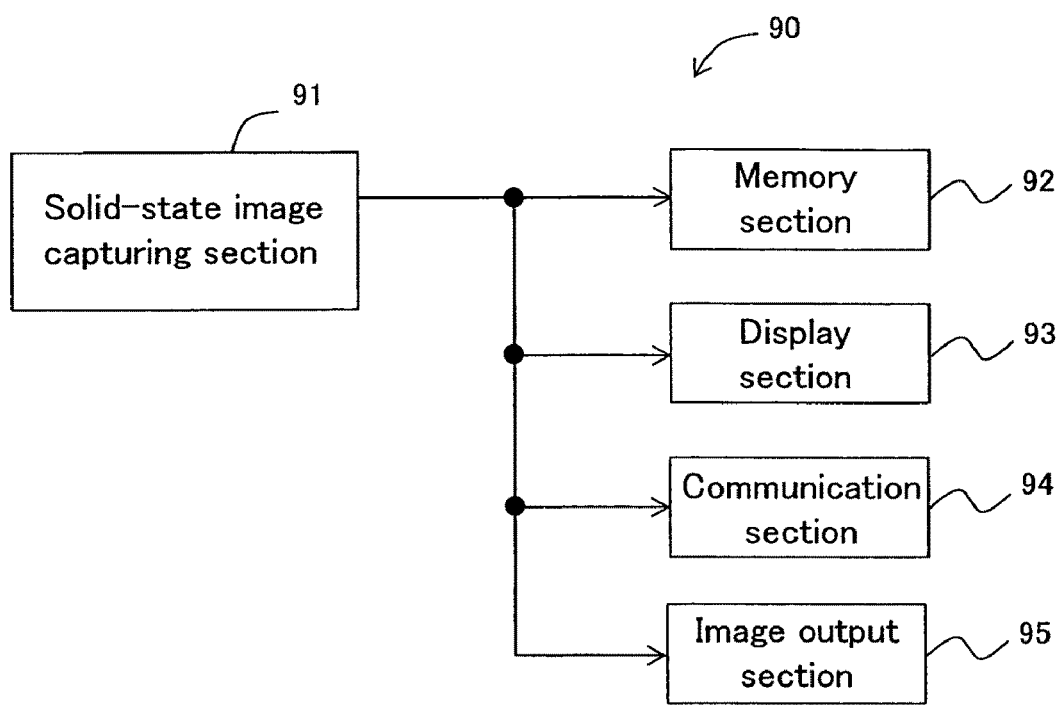
FIG. 13 is a block diagram showing a schematic exemplary configuration of an electronic information device using any of the image sensors according to Embodiments 1-4 in a image capturing section, as the Embodiment 5 of the present invention.

FIG. 13 is a block diagram showing a schematic exemplary configuration of an electronic information device using the image sensor according to Embodiments 1-4 in an image capturing section, as the Embodiment 5 of the present invention.

The electronic information device 90 according to the Embodiment 5 of the present invention shown in FIG. 13 includes at least one of the following: a image capturing section 91 using at least any of the image sensors according to Embodiments 1 to 4 of the present invention; a memory section 92 (e.g., recording media) for data-recording high quality image data obtained by the image capturing section 91 after a predetermined signal process for recording is performed; a display section 93 (e.g., liquid crystal display device) for displaying the image data on a display screen (e.g., liquid crystal display screen) after a predetermined signal process for display is performed; a communication section 94 (e.g., transmitting and receiving device) for communicating image data after a predetermined signal process for communication is performed; and an image output-section 95 for printing (typing out) and outputting (printing out) the image data.

As described above, the present invention is exemplified by the use of its preferred embodiment. However, the present invention should not be interpreted solely based on the embodiment described above. It is understood that the scope of the present invention should be interpreted solely based on the claims. It is also understood that those skilled in the art can implement equivalent scope of technology, based on the description of the present invention and common knowledge from the description of the detailed preferred embodiment of the present invention. Furthermore, it is understood that any patent, any patent application and any references cited in the present specification should be incorporated by reference in the present specification in the same manner as the contents are specifically described therein.

INDUSTRIAL APPLICABILITY

The present invention provides an image sensor used in a cell phone device equipped with a camera, a digital still camera, or a monitoring camera, particularly, an image sensor with an improved image quality of the high luminance subject during photographing and which is capable of preventing the blackening phenomenon of the high luminance subject without having an increase in the chip size in the field of an image sensor comprising a plurality of pixels arranged in a matrix and a read line located for each pixel column for reading the pixel signal from the pixel of each pixel column.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image sensor comprising a plurality of pixels arranged in a matrix which detects a pixel signal of each pixel based on a voltage difference between a reset voltage which is a reference voltage of each pixel and a signal voltage generated by a photoelectric conversion at each pixel, the image sensor comprising:
   a plurality of read lines located for each pixel column, wherein the reset voltage and the signal voltage are read from the pixel of the corresponding pixel column; and
   a reset current supply section provided for each read line, wherein at the same time a first reset current is supplied from a pixel to the read line when reading the reset voltage from the pixel, the section supplies a second reset current to the read line such that a sum of the first reset current and the second reset current is constant.

2. An image sensor according to claim 1, wherein:
   the pixel comprises a first read transistor for supplying the first reset current to the read line by an application of the reset voltage to a gate in a time period for reading the reset voltage, and for supplying a pixel current corresponding to the signal voltage to the read line by an application of the signal voltage to a gate in a time period for reading the signal voltage; and
   the reset current supply section comprises a second read transistor for supplying the second reset current to the read line by an application of the reset voltage to a gate in a time period for reading the reset voltage.

3. An image sensor according to claim 2, wherein a gate length of a second read transistor constituting the reset current supply section is longer than a gate length of a first read transistor constituting the pixel.

4. An image sensor according to claim 1, wherein the reset current supply section comprises:
   a reset current supply circuit comprising a plurality of transistors in a serial connection which are connected between a source voltage and the read line, wherein at least one of the plurality of transistors in the serial connection is controlled to be in a conducting state for a time period for reading the reset voltage; and
   a constant-current source connected between the read line and a ground voltage.

5. An image sensor according to claim 4, wherein:
   the reset current supply circuit comprises two transistors in a serial connection connected between the source voltage and the read line;
   a source voltage is supplied to a gate of a transistor at the source voltage side of the two transistors in a serial connection; and
   a control signal is supplied to a gate of a transistor at the read line side of the two transistors in a serial connection.

6. An image sensor according to claim 4, wherein:
   the reset current supply circuit comprises two transistors in a serial connection connected between the source voltage and the read line; and
   a control signal is supplied to gates of the two transistors in a serial connection.

7. An image sensor according to claim 4, wherein:
   the reset current supply circuit comprises two transistors in a serial connection connected between the source voltage and the read line;
   a reset voltage is supplied to a gate of a transistor at the read line side of the two transistors in the serial connection; and
   a control signal is supplied to a gate of a transistor at the source voltage side of the two transistors in the serial connection.

8. An image sensor according to claim 4, wherein:
   the reset current supply circuit comprises a single transistor connected between the source voltage and the read line;
   a control signal is supplied to a gate of the single transistor.

9. An image sensor according to claim 4, wherein the pixel comprises:
   a photo diode for performing a photoelectric conversion;
   a selecting transistor for selecting the pixel;
   a read transistor connected between the selecting transistor and the reset voltage, the read transistor for reading a level of a charge generated by the photoelectric conversion at the photo diode;

a reset transistor for controlling the read transistor such that the read transistor outputs the reset voltage; and
a transmission transistor for transmitting a charge level generated by the photoelectric conversion at the photo diode to the read transistor,
wherein in the selected pixel, after the reset voltage is read, a signal voltage generated by the photoelectric conversion is read.

10. An image sensor according to claim 9, wherein the reset current supply current is a dummy pixel located in a shaded area,
wherein the dummy pixel comprises:
a photo diode for performing a photoelectric conversion;
a selecting transistor for selecting the dummy pixel in a period for reading the reset voltage;
a read transistor connected between the selecting transistor and the source voltage, the read transistor for reading a level of a charge generated at the dummy pixel;
a reset transistor for always supplying the reset voltage to the gate of the read transistor; and
a transmission transistor connected between the photo diode and the read transistor, wherein a gate voltage is fixed at an off voltage of the transistor.

11. An image sensor according to claim 9, wherein the reset current supply current is a dummy pixel located in a shaded area,
wherein the dummy pixel comprises:
a selecting transistor for selecting the dummy pixel in a period for reading the reset voltage;
a read transistor connected between the selecting transistor and the source voltage, the read transistor for reading a level of a charge generated at the dummy pixel; and
a reset transistor for always supplying the reset voltage to the gate of the read transistor.

12. An image sensor according to claim 4, wherein the pixel comprises:
a photo diode for performing a photoelectric conversion;
a selecting transistor for selecting the pixel;
a read transistor connected between the selecting transistor and the source voltage, the read transistor for reading a level of a charge generated by the photoelectric conversion at the photo diode; and
a reset transistor for controlling the read transistor such that the read transistor outputs the reset voltage,
wherein in the selected pixel, after a signal voltage generated by the photoelectric conversion is read, the reset voltage is read.

13. An image sensor according to claim 12, wherein the reset current supply current is a dummy pixel located in a shaded area,
wherein the dummy pixel comprises:
a photo diode for performing a photoelectric conversion;
a selecting transistor for selecting the dummy pixel in a period for reading the reset voltage;
a read transistor connected between the selecting transistor and the source voltage, the read transistor for reading a level of a charge generated at the dummy pixel; and
a reset transistor for always supplying the reset voltage to the gate of the read transistor.

14. An image sensor according to claim 12, wherein the reset current supply current is a dummy pixel located in a shaded area,
wherein the dummy pixel comprises:
a selecting transistor for selecting the dummy pixel in a period for reading the reset voltage;
a read transistor connected between the selecting transistor and the source voltage, the read transistor for reading a level of a charge generated at the dummy pixel; and
a reset transistor for always supplying the reset voltage to the gate of the read transistor.

15. An electronic information device using the image sensor according to claim 1 in an image capturing section.

* * * * *